United States Patent Office 3,558,275
Patented Jan. 26, 1971

3,558,275
PROCESS FOR PREPARING DIBORANE
Gerald H. Reifenberg, Hightstown, and William J. Considine, Somerset, N.J., assignors to M & T Chemicals Inc., New York, N.Y., a corporation of Delaware
No Drawing. Filed July 3, 1968, Ser. No. 742,201
Int. Cl. C01b 6/10
U.S. Cl. 23—204                    3 Claims

ABSTRACT OF THE DISCLOSURE

The process of this invention for preparing diborane, $B_2H_6$, comprises reacting as reactants stannane, $SnH_4$, and a complex comprising boron trihalide and a Lewis base, maintaining said reactants together in a reaction mixture, and separating diborane, $B_2H_6$, from said reaction mixture.

---

This invention relates to a process for producing diborane, $B_2H_6$.

The process of this invention for preparing diborane, $B_2H_6$, comprises reacting as reactants stannane, $SnH_4$, and a complex comprising boron trihalide and a Lewis base, maintaining said reactants together in a reaction mixture, and separating diborane, $B_2H_6$, from said reaction mixture.

According to another of its aspects, the process of this invention for preparing diborane, $B_2H_6$, comprises reacting as reactants tin tetrahalide and lithium aluminum hydride to produce stannane, $SnH_4$, maintaining said reactants together in a reaction mixture, and separating stannane, $SnH_4$, from said reaction mixture, reacting as reactants said stannane, $SnH_4$, and a complex comprising boron trihalide and a Lewis base to produce diborane, $B_2H_6$, maintaining said stannane, $SnH_4$, and said complex together in a reaction mixture, and separating diborane, $B_2H_6$, from said reaction mixture.

Boron trihalides operable in forming complexes with Lewis bases include boron trichloride, boron tribromide, boron trifluoride, and boron triiodide.

Generally, any Lewis base capable of forming a complex with a boron trihalide is operable in the practice of this invention. Lewis bases operable in the practice of this invention include organic ethers. As a practical matter, those ethers exhibiting a molecular weight of less than 600 have been found to be most suitable.

As used herein the term "ether" includes any compound which contains the ether linkage

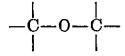

These include simple monoethers, cyclic ethers, and polyethers. Some ethers operable in this invention are defined by the formula (X—)OR wherein X is a radical of the class R—, ROR'—, and R(OR''—)$_n$ in which R is a monovalent aliphatic or aromatic radical; and R'' is a divalent alkylene radical and $n$ is an integer.

Other ethers operable in this invention are defined by the formula

wherein X is a methylene group; R'' is an unsubstituted saturated divalent aliphatic hydrocarbon radical; R' is an ethylene radical, divalent hydrocarbon radical, a methylene radical, or —CHR''', (R''' being hydrogen or an aliphatic radical); and O is oxygen.

Specific Lewis bases operable in the practice of this invention include ethyl ether, methyl phenyl ether, o-cresyl methyl ether, methyl-β-naphthyl ether, n-amyl ether, diphenyl ether, dodecyl ether, tetrahydrofuran, tetrahydropyran, 2-methyltetrahydrofuran, 2-ethoxytetrahydropyran, and tetrahydrofurfuryl ethyl ether.

Stannane, $SnH_4$, may be prepared by reacting tin tetrachloride, tin tetrabromide or tin tetraiodide with lithium aluminum hydride in the presence of a nitrogen atmosphere containing about 0.1% oxygen.

In practicing the first step of this invention a tin tetrahalide compound is reduced to stannane, $SnH_4$, in the presence of lithium aluminum hydride. The reduction may be, preferably, conducted initially at a temperature of $-195°$ C., maintained by immersion of the reaction vessel or trap, in a liquid nitrogen bath; carried out in a nitrogen atmosphere containing approximately 0.1% by weight oxygen; in the presence of an inert diluent or solvent, e.g. ethyl ether, tetrahydrofuran, tetrahydropyran, 2 - methyl tetrahydrofuran, 2 - ethoxytetrahydropyran, and tetrahydrofurfuryl ethyl ether.

All reactions of this invention are preferably carried out under inert atmosphere, e.g. nitrogen containing 0.1% by weight oxygen since stannane, $SnH_4$, is relatively unstable.

In carrying out the reduction of tin tetrahalide, said tin tetrahalide should be contacted with lithium aluminum hydride at a temperature ranging from $-200°$ C. to $20°$ C. The temperature initially is preferably near $-200°$ C. and is preferably elevated slowly to $-70°$ C. to avoid decomposing stannane. It is noted that the melting point of stannane, $SnH_4$, is $-146°$ C. and the boiling point is $-52.5°$ C.

In reducing tin tetrahalide to stannane the molar ratio of catalyst to tin tetrahalide should be greater than unity, preferably 2 or 3 to 1.

During the reduction step, the following typical reaction may occur: $SnCl_4 + LiAlH_4 \rightarrow SnH_4 + LiAlCl_4$.

Solvents or diluents suitable as the reaction medium of this invention include aliphatic hydrocarbons, aromatic hydrocarbons and ethers. The foregoing may contain carboxylic esters, carboxylic amides, and nitrile groups as substituents. Aromatic amino groups, but not aliphatic amino groups, may also be present as substituents. Among the suitable solvents are diethyl ether and tetrahydrofuran.

The practice of the second step of this invention may be effected by charging boron trihalide etherate into a reaction vessel or trap. The vessel may be preferably immersed in liquid nitrogen, the liquid nitrogen exhibiting a temperature of approximately $-195°$ C. Stannane, $SnH_4$, may then be passed into the reaction vessel or trap, after which the temperature may be adjusted, slowly and incrementally, to room temperature, approximately $20°$ C. The temperature adjustment may be effected by transferring the reaction vessel, or trap, from the liquid nitrogen bath (at $-195°$ C.) to a Dry Ice-acetone bath at approximately $-78°$ C.; and thereafter, to an ice-methanol bath at $-22°$ C. After removing the reaction mixture from the ice-methanol bath the temperature is allowed to rise to room temperature.

The molar ratio of stannane to boron trihalide etherate should be at least unity.

Practice of this invention may be observed from the following illustrative examples.

EXAMPLE 1

A 250-milliliter 2-necked flask was placed in a liquid nitrogen bath at $-196°$ C. The atmosphere surrounding the system was nitrogen containing 0.1% oxygen 6.5 grams (0.025 mole) of tin tetrachloride and 4.8 grams (0.125 mole) of lithium aluminum hydride were charged to the reaction vessel. The temperature of the reaction vessel was slowly increased and at $-62°$ C. ebullition of gas was observed. The temperature was slowly and incrementally increased to room temperature 27° C. whereupon the stannane, $SnH_4$, product was collected in traps. The stannane product exhibited a weight of 2.65 grams, and a 87.2% yield.

The reaction trap was then placed in a liquid nitrogen bath exhibiting a temperature of —195° C. 2.65 grams (0.222 mole) of stannane, $SnH_4$, was added to the reaction vessel, followed by the addition of 3.55 grams (0.29 mole) of boron trifluoride ethyl etherate. The temperature of the reaction mass was then adjusted by sequentially transferring the reaction vessel from the liquid nitrogen bath to a Dry Ice-acetone bath exhibiting a temperature of approximately —78° C. and then to an ice-methanol bath at —22° C. The temperature of the reaction vessel was then allowed to rise to room temperature.

The quantity of diborane, a gas, evolved was measured by the quantity of tin tetrafluoride produced. The tin tetrafluoride produced exhibited a weight of 1.95 grams. The identification of tin tetrafluoride was confirmed by X-ray analysis.

EXAMPLE 2

The procedure of Example 1 was followed except that 4.8 grams (0.125 mole) of lithium aluminum hydride and 6.5 grams of tin tetrahalide were charged to the reactor for the generation of 2.7 grams of stannane, $SnH_4$. For the production of diborane, the reactor was charged with 3.5 grams (0.029 mole) of boron trifluoride etherate.

The quantity of diborane, a gas, prepared was necessarily commensurate with the quantity of tin tetrafluoride produced. Tin tetrafluoride produced by the foregoing reaction exhibited a weight of 2.3 grams. The identification of tin tetrafluoride was confirmed by X-ray analysis.

Although this invention has been illustrated by reference to specific examples, modifications thereof which are clearly within the scope of the invention will be apparent to those skilled in the art.

We claim:
1. The method for preparing diborane, $B_2H_6$, which comprises reacting as reactants stannane, $SnH_4$, and a complex comprising boron trihalide and a Lewis base selected from ethers exhibiting molecular weights of less than 600, maintaining said reactants together in a reaction mixture in a substantially inert atmosphere at a temperature of from —200° C. to 20° C. and separating diborane, $B_2H_6$, from said reaction mixture.

2. The method of claim 1 wherein said complex comprising boron trihalide and a Lewis base is boron trifluoride ethyl etherate.

3. The method for preparing diborane, $B_2H_6$, which comprises reacting as reactants tin tetrahalide and lithium aluminum hydride to produce stannane, $SnH_4$, maintaining said reactants together in a reaction mixture at a temperature of from —200° C. to —70° C., and separating stannane, $SnH_4$, from said reaction mixture, reacting as reactants said stannane, $SnH_4$, and a complex comprising boron trihalide and a Lewis base selected from ethers exhibiting molecular weights of less than 600, to produce diborane, $B_2H_6$, maintaining stannane, $SnH_4$, and said complex together in a reaction mixture in a substantially inert atmosphere at a temperature of from —200° C. to 20° C. and separating diborane, $B_2H_6$, from said mixture.

References Cited

UNITED STATES PATENTS

| | | | |
|---|---|---|---|
| 2,888,236 | 5/1959 | Schechter et al. | 23—204 |
| 3,066,013 | 11/1962 | Ramsden | 23—204 |
| 3,117,840 | 1/1964 | Joseph | 23—204 |

FOREIGN PATENTS

| | | | |
|---|---|---|---|
| 853,727 | 11/1960 | Great Britain | 23—204 |
| 1,142,589 | 1/1963 | Germany | 23—204 |

OSCAR R. VERTIZ, Primary Examiner

G. O. PETERS, Assistant Examiner